US005414531A

United States Patent [19]

Amemiya et al.

[11] Patent Number: 5,414,531

[45] Date of Patent: May 9, 1995

[54] IMAGE FORMING CONTROL BASED ON A STORED OPERATION CONDITION

[75] Inventors: Koji Amemiya, Tokyo; Akio Suzuki, Yokohama; Tatsuo Takeuchi; Hisashi Fukushima, both of Kawasaki; Takashi Hasegawa, Ageo; Haruhiko Moriguchi, Yokohama; Rie Saito, Yokohama; Takao Ogata, Yokohama; Nobuatsu Sasanuma, Yamato, all of Japan

[73] Assignee: Canon Kabushiki Kaisha, Tokyo, Japan

[21] Appl. No.: 838,321

[22] Filed: Feb. 20, 1992

[30] Foreign Application Priority Data

Feb. 22, 1991 [JP] Japan .................................. 3-028632
Feb. 22, 1991 [JP] Japan .................................. 3-028763

[51] Int. Cl.⁶ ................................................ H04N 1/40

[52] U.S. Cl. ...................................... 358/465; 358/466

[58] Field of Search ................................ 358/465–466, 358/227, 213.19, 446, 461, 455, 475, 464, 405–406

[56] References Cited

U.S. PATENT DOCUMENTS

| | | | |
|---|---|---|---|
| 3,723,649 | 3/1973 | Pitegoff et al. | 358/465 |
| 4,760,608 | 7/1988 | Suzuki | 382/61 |
| 4,888,636 | 12/1989 | Abe | 358/80 |
| 5,027,177 | 6/1991 | Yoshida et al. | 358/465 |
| 5,055,943 | 10/1991 | Kishida | 358/466 |
| 5,159,471 | 10/1992 | Satou et al. | 358/465 |

*Primary Examiner*—Stephen Brinich

*Attorney, Agent, or Firm*—Fitzpatrick, Cella, Harper & Scinto

[57] ABSTRACT

An image forming apparatus includes an image forming unit for forming an image on a recording medium, and a measurement unit which measures the density of the image formed on the recording medium. A control unit determines an operation condition of the image forming unit on the basis of the measurement result from the measurement unit. A storage unit stores the operation condition determined by the control unit, and a display unit reads out the operation condition at a predetermined time for display. The control means controls a subsequent operation of the image forming apparatus according to the stored operation condition.

26 Claims, 9 Drawing Sheets

| | (REFERENCE VALUE) | (ACTUAL OUTPUT VALUE) |
|---|---|---|
| (PRIMARY CURRENT) | 500 (μA) | 510 (μA) |
| (PRIMARY GRID) | 700 (V) | 720 (V) |
| (DEVELOPMENT BIAS) | 550 (V) | 570 (V) |

| | (REFERENCE VALUE) | (DIFFERENCE FROM REFERENCE VALUE) |
|---|---|---|
| (PRIMARY CURRENT) | 500 | +10 |
| (PRIMARY GRID) | 700 | +20 |
| (DEVELOPMENT BIAS) | 550 | +20 |

FIG. 14A

| | (CONTROL STATE) |
|---|---|
| (PRIMARY CURRENT) | +② |
| (PRIMARY GRID) | +① |
| (DEVELOPMENT BIAS) | +② |

FIG. 14B

| DISPLAY | -⑤ | -④ | -③ | -② | -① | ⓪ | +① | +② | +③ | +④ | +⑤ |
|---|---|---|---|---|---|---|---|---|---|---|---|
| PRIMARY CURRENT | 450 | 460 | 470 | 480 | 490 | 500 | 510 | 520 | 530 | 540 | 550 |
| PRIMARY GRID | 600 | 620 | 640 | 660 | 680 | 700 | 720 | 740 | 760 | 780 | 800 |
| DEVELOPMENT BIAS | 500 | 510 | 520 | 530 | 540 | 550 | 510 | 520 | 530 | 540 | 550 |

FIG. 15

| | (CONTROL STATE) | | | | |
|---|---|---|---|---|---|
| | 1 | 2 | 3 | 4 | 5 |
| (PRIMARY CURRENT) | ⓪ | +① | +① | +② | +④ |
| (PRIMARY GRID) | ⓪ | +① | +① | +③ | +⑤ |
| (DEVELOPMENT BIAS) | ⓪ | +① | +① | +② | +④ |

| | (CONTROL STATE) | | | | |
|---|---|---|---|---|---|
| | 1 | 2 | 3 | 4 | 5 |
| (PRIMARY CURRENT) | +① | +① | +② | +④ | +⑤ |
| (PRIMARY GRID) | +① | +① | +③ | +⑤ | +⑤ |
| (DEVELOPMENT BIAS) | +① | +① | +② | +④ | +④ |

IMAGE FORMING CONTROL BASED ON A STORED OPERATION CONDITION

BACKGROUND OF THE INVENTION

1. Field of the Invention

The present invention relates to an image forming apparatus for forming a sample image on a recording medium, detecting a state of the sample image, and controlling an image forming condition on the basis of the detection result.

2. Related Background Art

A conventional method such as image stabilization control is known. In this method, a sample image having predetermined gray-scale levels is formed on a recording medium, the image density of the sample image is measured, and an image forming condition or an image processing condition is changed on the basis of the measurement result, thereby obtaining an image having good gray-scale characteristics (e.g., U.S. Pat. No. 4,888,636, U.S. patent application Ser. No. 760,575). In an image stabilization control method, even when the characteristics of a photosensitive body have deteriorated or even when toner replenishment cannot be precisely performed, an image having gray-scale characteristics that are as high as possible can be obtained without maintenance by a service person.

However, even when the characteristics of the photosensitive body have deteriorated, such deterioration cannot be found early, or a necessary time for scheduling maintenance cannot be easily determined.

When a formed image has poor quality, it cannot be easily determined whether image quality is poor, even if the above-mentioned image stabilization control is sufficiently performed, or image quality is poor since the above-mentioned image stabilization control is not sufficiently performed.

SUMMARY OF THE INVENTION

It is an object of the present invention to provide an image forming apparatus free from the above-mentioned drawbacks.

It is another object of the present invention to provide an image forming apparatus, which can store data obtained when image stabilization control is performed, and can display the stored data at a desired time, thus allowing easy maintenance of the image forming apparatus.

It is still another object of the present invention to provide an image forming apparatus, which can inform that a proper image forming condition cannot be obtained even when image stabilization control is executed, thus allowing easy maintenance of the image forming apparatus.

It is still another object of the present invention to provide an image forming apparatus, which can execute image stabilization control at an arbitrary time, thus allowing easy maintenance of the image forming apparatus.

Other objects of the present invention will become apparent from the following description taken in conjunction with the accompanying drawings, and the appended claims.

BRIEF DESCRIPTION OF THE DRAWINGS

FIGS. 14A and 14B are tables illustrating display examples according to another embodiment of the present invention;

FIG. 15 is a table illustrating a display example according to still another embodiment of the present invention;

DETAILED DESCRIPTION OF THE PREFERRED EMBODIMENTS

An embodiment of the present invention will be described in detail hereinafter with reference to the accompanying drawings.

Figure 1:
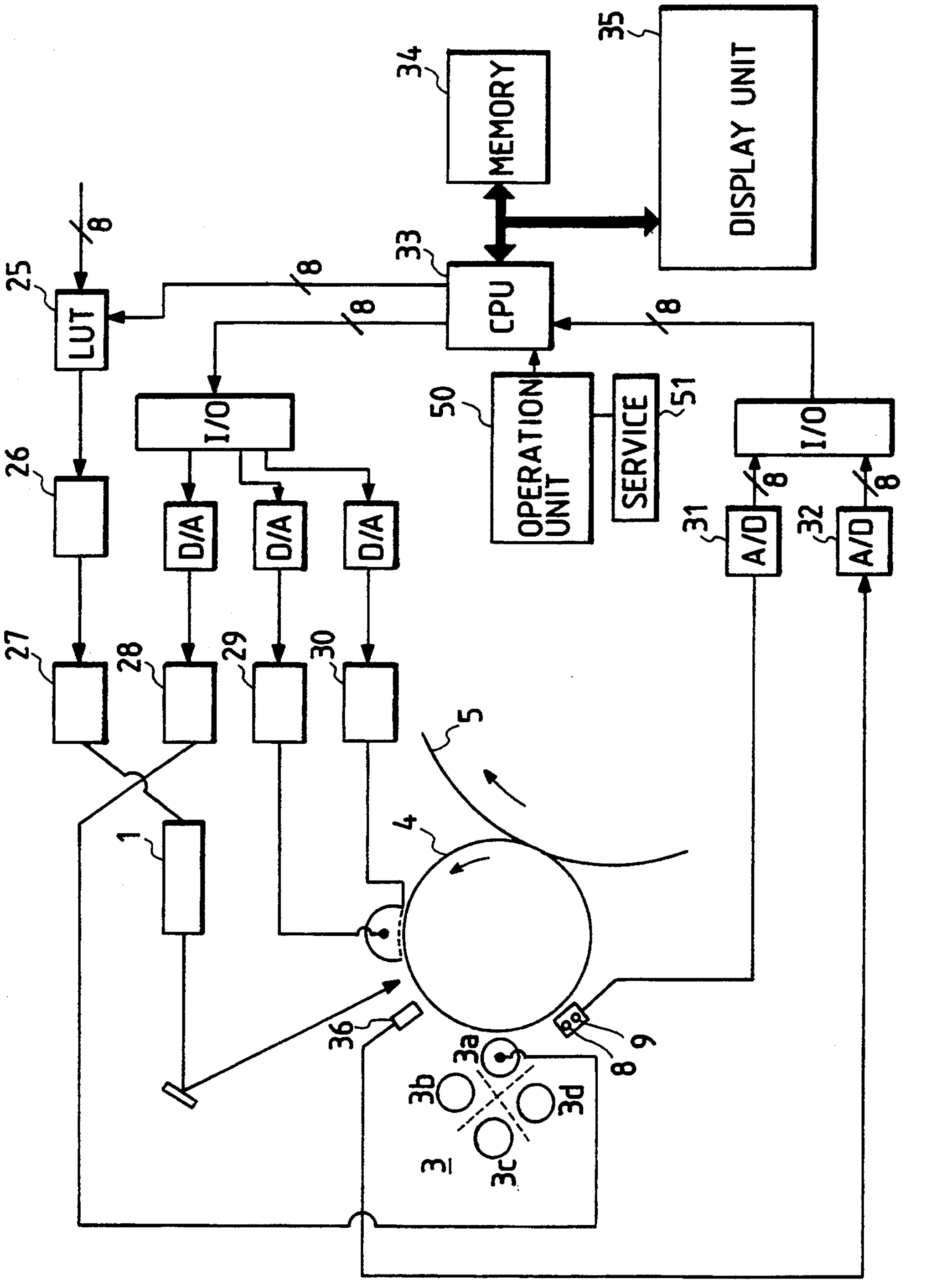
FIG. 1 is a diagram showing an embodiment of the present invention.

FIG. 1 illustrates an embodiment of the present invention in which, an image signal from an original scanner is converted into a laser beam through a laser driver 27 and a laser unit 1. The laser beam is reflected by a polygonal mirror and a mirror in the laser unit 1, and is radiated on a photosensitive drum 4. The photosensitive drum 4, on which a latent image is formed upon scanning of the laser beam, is rotated in the direction of the arrow. Thus, developing operations in units of colors are performed by a rotary developing unit 3 (FIG. 1 illustrates the developing operation with a yellow toner).

On the other hand, a transfer sheet 6 is wound around a transfer drum 5. The transfer drum 5 makes one revolution in the order of Y (yellow), M (magenta), C (cyan), and Bk (black), i.e., a total of four revolutions, thus completing a transfer operation.

Upon completion of the transfer operation, the transfer sheet 6 is peeled from the transfer drum 5, and toner images are fixed on the transfer sheet 6 by a pair of fixing rollers, thereby completing a color image print.

An LED 8 serves as an illumination means for emitting near infrared light (having a principal wavelength of about 960 nm). A light-receiving element (sensor) 9 receives near infrared light reflected by the photosensitive drum 4, and is used for reading a patch pattern (to be described in detail later).

Figure 2:
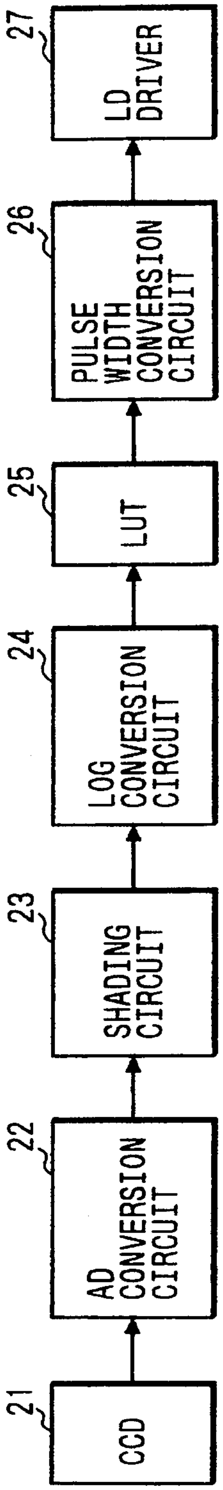
FIG. 2 is a block diagram showing a processing circuit for processing an electrical signal from a CCD.

FIG. 2 illustrates an image signal processing circuit for obtaining a gray-scale image according to this embodiment.

An original image is read by a CCD 21 of an original scanner, and its luminance signal is converted into a digital luminance signal by an A/D conversion circuit 22.

A variation in sensitivity of CCD elements in the obtained luminance signal is corrected by a shading circuit 23. The corrected luminance signal is converted into a density signal by a LOG conversion circuit 24. The obtained density signal is converted by a look-up table (LUT) 25 to obtain $\gamma$ characteristics of a printer in an initial state, so that an original image density coincides with an output image density. The $\gamma$ characteristics of the LUT 25 are corrected by a LUT correction table generated based on calculation results (to be described later). After the density signal is converted by the LUT 25, the density signal is converted into a signal corresponding to a dot width by a pulse width conversion circuit 26, and the converted signal is sent to an LD driver 27. Upon scanning of a laser, a latent image having gray-scale characteristics expressed by changes in area of dots is formed on the photosensitive drum 4, and a gray-scale image is obtained via developing, transfer, and fixing processes.

The image forming apparatus incorporates a test pattern generator for forming a specific pattern on the photosensitive drum 4. The test pattern generator can change the density signal level between multiple levels.

The density signal has 8 bits, i.e., can express 256 gray-scale levels. The test pattern generator forms gray-scale patterns corresponding to five different levels, e.g., 00H, 40H, 80H, C0H, and FFH, on the photosensitive drum 4.

A toner image of a specific pattern is formed on an image carrier (photosensitive drum), and its density is measured by the LED 8 and the sensor 9. The toner replenishment amount is determined on the basis of the difference between the measured near infrared light amount and a reference near infrared light amount, thus maintaining a constant toner concentration in a developing unit.

Figure 3:
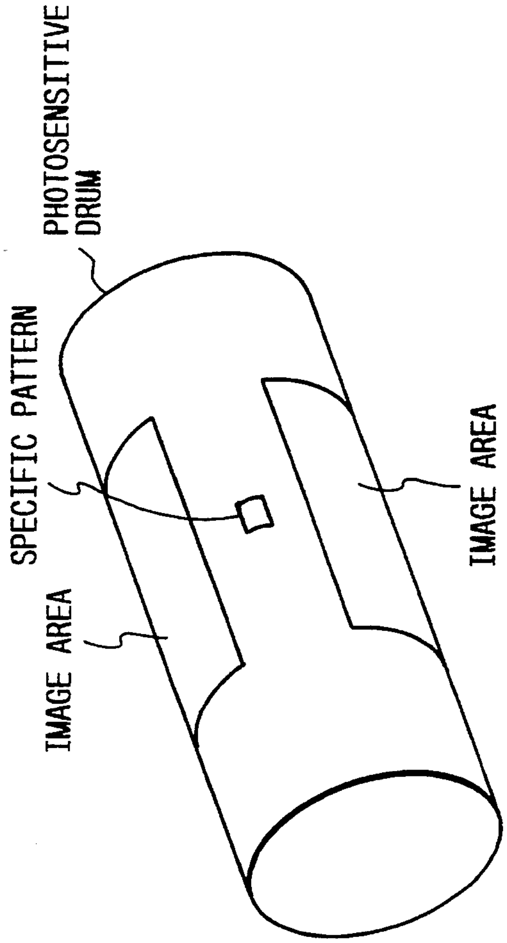
FIG. 3 is a view of a photosensitive drum showing a position on the drum for forming a specific pattern patch.

Normally, when a specific pattern is formed for this purpose, it is preferably formed on a non-image area of the photosensitive drum, as shown in FIG. 3.

Figure 4:
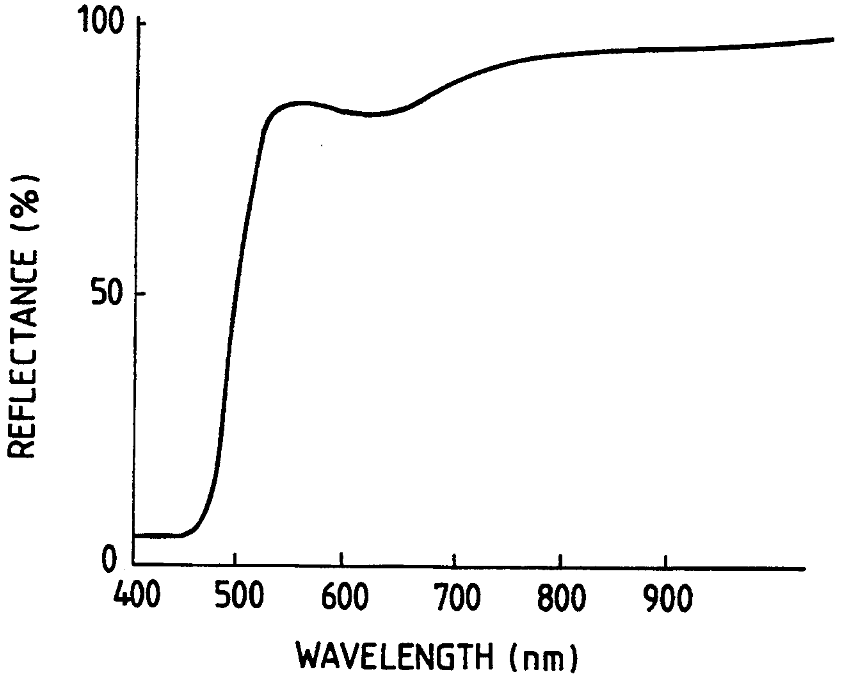
FIG. 4 is a graph illustrating yellow toner spectrum characteristics.
Figure 5:
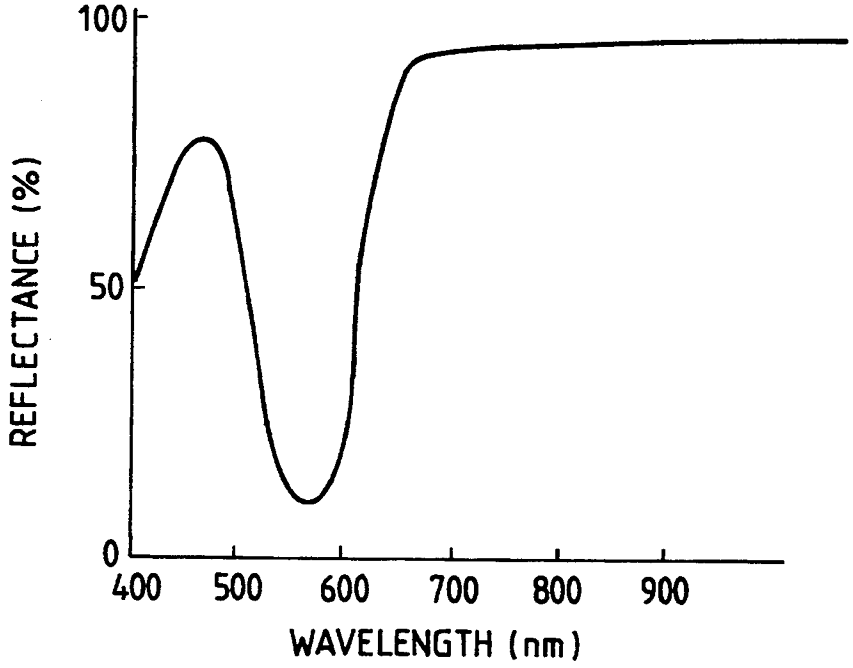
FIG. 5 is a graph illustrating magenta toner spectrum characteristics.
Figure 6:
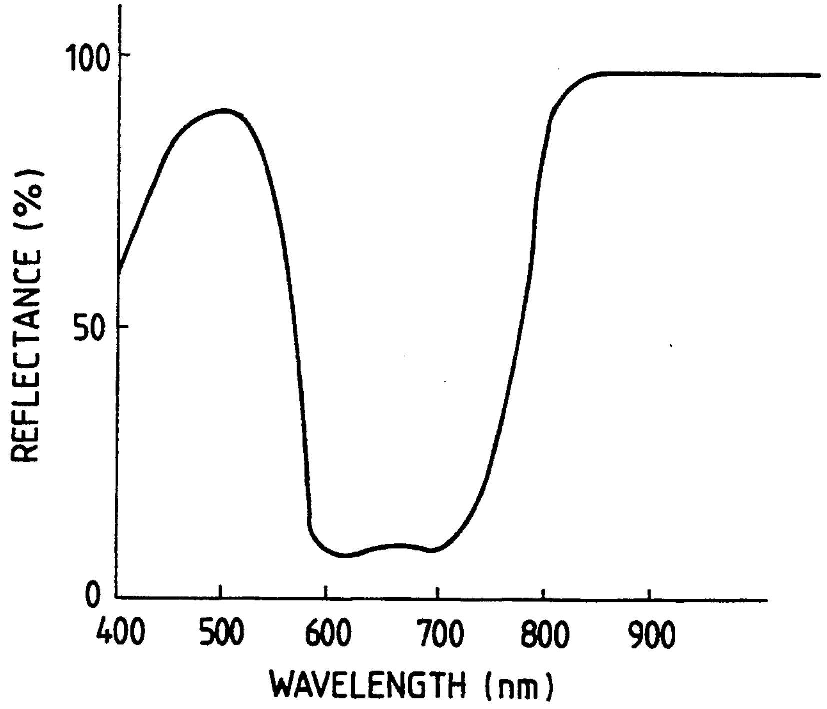
FIG. 6 is a graph illustrating cyan toner spectrum characteristics.

Color toners used in this embodiment are yellow, magenta, and cyan toners, and these toners are formed by dispersing corresponding color materials using a styrene-based copolymer resin as a binder. In spectral characteristics of the yellow, magenta, and cyan toners, as shown in FIGS. 4 to 6 in the order named, a reflectance of 80% or higher can be obtained for near infrared light (960 nm). In these color toner image formation processes, a two-component developing method advantageous for color purity and transmission characteristics is adopted. The average toner particle size to be used falls within a range of 8 and 12 $\mu$m, and toner particles are prepared by a known grinding method. The equivalent results could also be obtained with polymerized color toners prepared by a suspension polymerization method.

Figure 7:
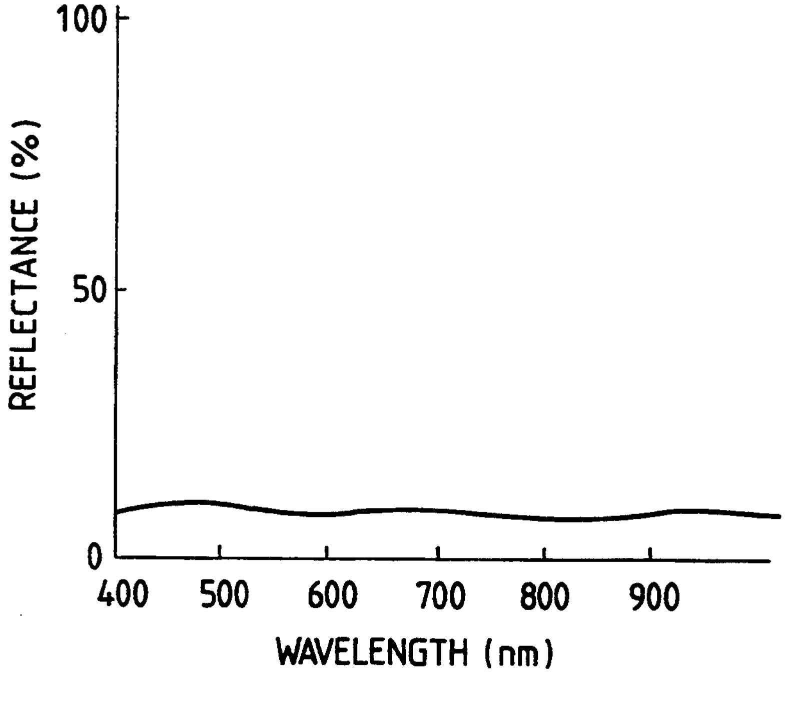
FIG. 7 is a graph illustrating black (one-component magnetic) toner spectral characteristics.

A one-component magnetic toner, that is proved to have an effect of reducing running cost as a toner for a monochrome copy, is used as a black toner, and has a reflectance of about 10% for near infrared light (960 nm), as shown in FIG. 7. The average particle size and shape of the black toner comply with those of the two-component toners. The black toner employs a one-component jumping developing method. The photosensitive drum 4 has a reflectance of about 40% for light of 960 nm. Note that the photosensitive drum 4 comprises an OPC drum.

Figure 8:
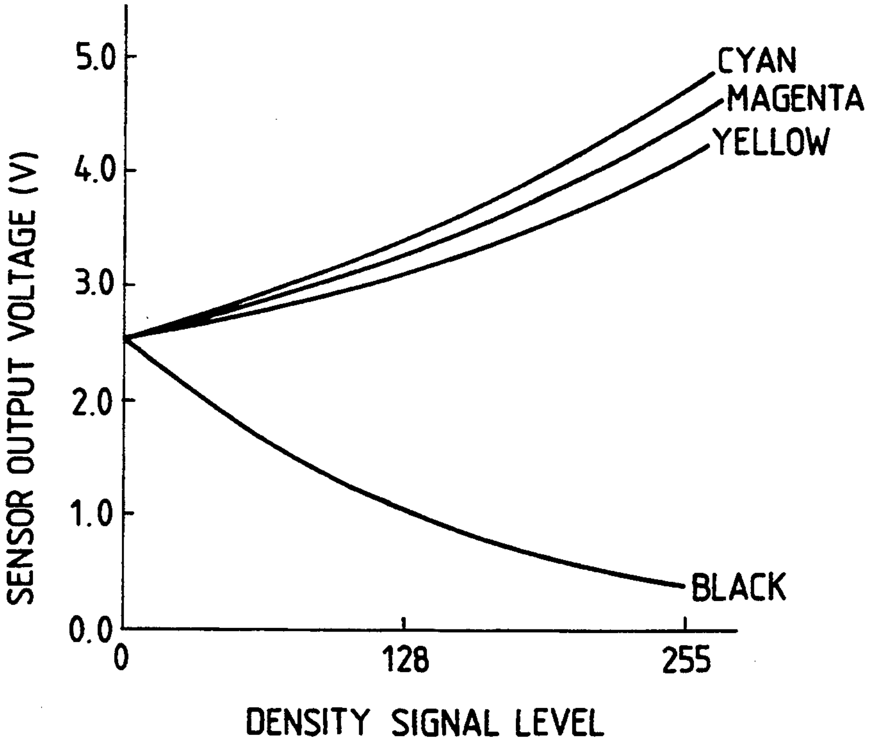
FIG. 8 is a graph illustrating the sensor output as a function of the density signal level obtained when near infrared light is used.

FIG. 8 shows the relationship between the density signal level and the output from the sensor 9 obtained when the density on the photosensitive drum 4 at a proper toner concentration is changed stepwise by a pulse-width-converted area gray-scale expression of each color. The output from the sensor 9 when no toner was attached to the photosensitive drum 4 was set to be 2.5 V. As can be seen from FIG. 8, as the density signal level is increased, i.e., as the area coverage factor is increased, the reflected light amounts of the yellow, magenta, and cyan toners increase to be larger than that of the photosensitive drum 4 itself, and the corresponding outputs from the sensor 9 increase. On the other hand, as the density signal level is increased, i.e., as the area coverage factor is increased, the reflected light amount of the black toner decreases to be smaller than that of the photosensitive drum 4 itself, and the corresponding output from the sensor 9 decreases.

By utilizing these relationships, the state of an output image can be obtained based on the sensor outputs even when using toners having different reflection characteristics without transferring and fixing toners on a transfer sheet.

Figure 9:
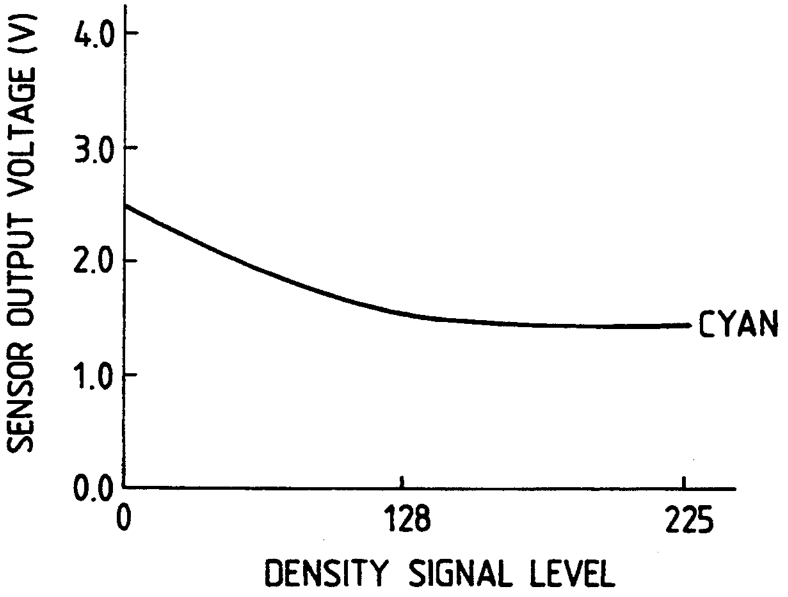
FIG. 9 is a graph illustrating sensor output as a function of the density signal level obtained when visible light is used.

FIG. 9 shows the relationship between the density signal level and the sensor output obtained upon measurement using the cyan toner through a red color-separation filter having a principal wavelength of 600 nm. As can be seen from FIG. 9, at an output density of 1.0 or higher, a change in sensor output becomes small and density detection precision is impaired. This is because the gray-scale reproduction method of this embodiment is based on an area gray-scale method. In practice, however, it was observed that the sensor output was changed in a high-density region not only based on the area but also in a direction of thickness of a toner.

In the measurement using visible light, when the photosensitive drum is covered with one toner layer, the signal is saturated. Contrary to this, in the measurement using near infrared light, since the transmittance of the near infrared light is better than visible light, the near infrared light can enter toner multilayers, and the saturation point of the signal is high. A near infrared light source is advantageous since the measurement range can have a large width.

The wavelength of near infrared light to be used is 960 nm in this embodiment. The wavelength of the near infrared light preferably falls within a range between 800 nm and 2,000 nm depending on the spectral characteristics of the toners and the photosensitive body, and the characteristics of various light sources and the light-receiving element.

Figure 10:
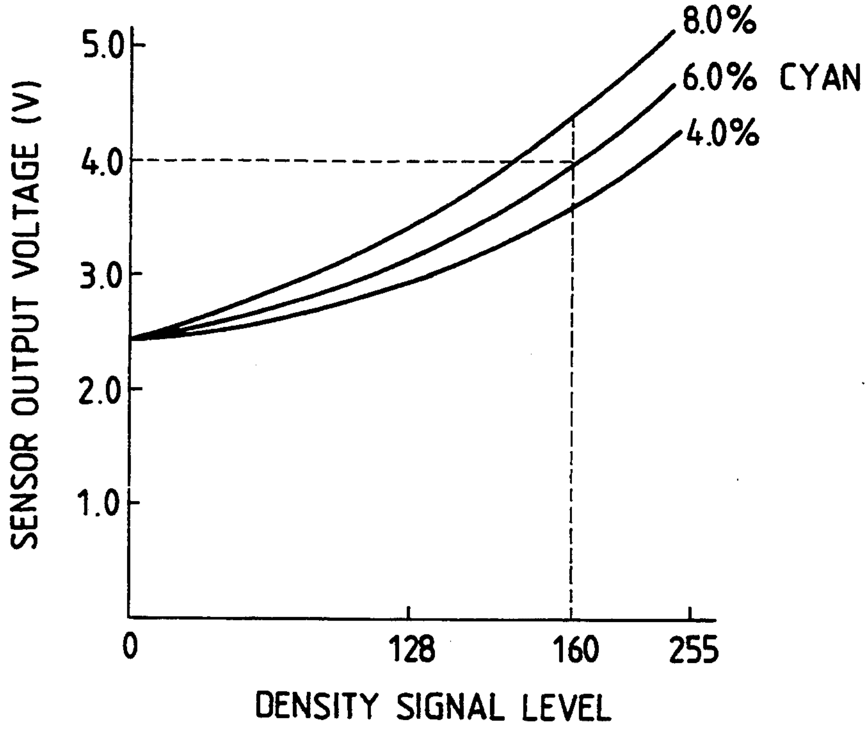
FIG. 10 is a graph illustrating sensor output as a function of the density signal level obtained when toner (developing agent) concentration of a cyan toner is changed.

FIG. 10 shows the relationship between the density signal level and the output from the sensor 9 obtained when the toner concentration of the cyan toner is changed.

The proper toner concentration (toner/carrier) of the cyan toner, which did not cause a fog, and could provide a sufficient maximum image density, was 6.0%.

These characteristics were set as reference characteristics of the printer of this embodiment.

Figure 11:
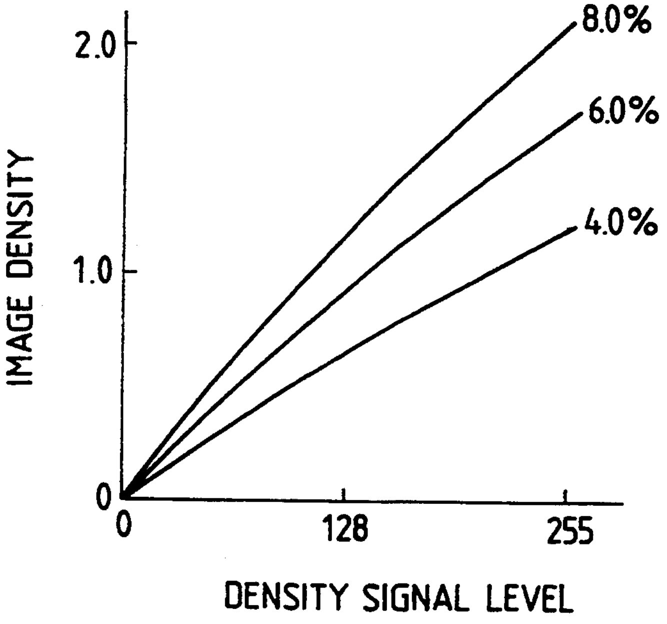
FIG. 11 is a graph illustrating image density as a function of the density signal level obtained when toner concentration of cyan toner is changed.

On the other hand, it was found that the above characteristic changed as shown in FIG. 11 when the toner concentration (toner/carrier) was changed to 4.0% and 8.0%.

When the toner concentration is high, hard gray-scale characteristics are obtained; when it is low, soft gray-scale characteristics are obtained.

In an electrophotography method, it is known that when the contrast potential is increased, a hard image is obtained and when the contrast potential is decreased a soft image is obtained.

Therefore, as for the cyan toner, when a pattern image having a density signal level=160 is formed as a specific pattern on the image carrier, and the output from the sensor 9 is higher than 4.0 V, an image harder than, and having a higher maximum density than that of a reference image is obtained. For this reason, in order to correct these characteristics to the reference characteristics, the amount of decrease in contrast potential is determined on the basis of the difference from 4.0 V, and after the determined contrast potential is set, an image formation process is performed.

In contrast to this, when the output from the sensor 9 is lower than 4.0 V, the amount of increase in contrast potential is determined on the basis of the difference from 4.0 V, and after the determined contrast potential is set, an image formation process is performed.

In the present invention, the combinations of density signal levels and sensor outputs, which combinations can provide proper images, of the cyan, magenta, yellow, and black toners are stored in advance in a memory, and the above-mentioned control is performed for all colors. As a result, an image formation process can always be performed with a stable color balance and maximum densities.

The above-mentioned control is preferably performed, e.g., after the power switch of the image forming apparatus is turned on and before a copying operation (print-out operation).

The gray-scale control can be roughly classified into two control operations.

(1) The maximum reproduction density of an image is adjusted to a target value.

(2) The look-up table (LUT) is set, so that an input image level and an output image density have a linear correlation therebetween.

In order to attain the above-mentioned control operations (1) and (2), predetermined driving operations of image forming elements are performed.

In this case, in order to set a maximum density, image data PG1 is output from a specific pattern output device (not shown), and a corresponding latent image is formed on the photosensitive drum 1.

Figures 12, 13A, 13B:
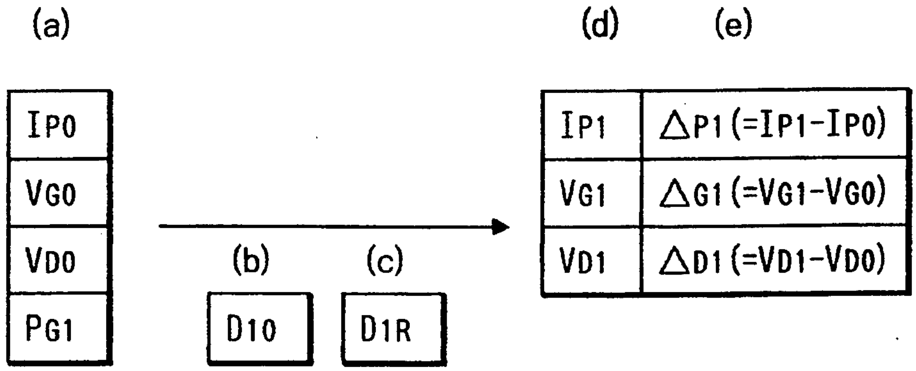
FIG. 12(*a–e*) is a table illustrating changes in currents and voltages according to the present invention.
FIGS. 13A and 13B are tables illustrating display examples according to an embodiment of the present invention.

The image forming elements are driven under conditions of a primary charging current=$I_{P0}$, a primary charging grid bias=$V_{G0}$, and a development bias =$V_{D0}$ (FIG. 12(*a*)).

As a result, the sensor 9 reads the density of the specific pattern. The read image density is represented by $D_{10}$ (FIG. 12(*b*)).

The measurement value $D_{10}$ is compared with a target image density $D_{1R}$ to calculate the difference therebetween, and the primary charging current, the primary charging grid bias, and the development bias are respectively determined as follows:

$$I_{P1}=(D_{1R}-D_{10})\times K_1\times I_{p0}$$

$$V_{G1}=(D_{1R}-D_{10})\times K_2\times V_{G0}$$

$$V_{D1}=(D_{1R}-D_{10})\times K_3\times V_{G0}+V_0$$

where $K_1$, $K_2$, and $K_3$ are constants obtained beforehand. $V_0$ in the equation for the development bias is the background compensation amount upon toner development.

According to the new constants $I_{P1}$, $V_{G1}$, and $V_{D1}$ obtained in this manner, a primary charging power supply 29, a primary charging grid bias 30, and a development bias 28 (FIG. 1) are driven. A CPU 33 stores the calculation results (FIG. 12(*d*)) in a programmable non-volatile memory.

As the storage method, a method of storing the calculation results as new control amounts, as shown in FIG. 12(*d*), or a method of storing the calculation results as differences ΔP1, ΔG1, and ΔD1 (FIG. 12(*e*)) from the predetermined reference values (FIG. 12(*a*)) can be employed.

An image formation process is performed based on data PG2, PG3, and PG4 having different density levels so as to generate constants capable of reproducing a maximum density according to a target value, and to form the look-up table (LUT) for gray-scale reproduction. As the levels of the data PG2, PG3, and PG4, levels necessary for forming the LUT can be used. Furthermore, data having another density level may be added, if necessary.

Image density data read by the sensor 9 are subjected to arithmetic processing for forming the LUT by the CPU 33, and are then subjected to interpolation smoothing processing, as needed. Thereafter, the image density data are set in the LUT 25 shown in FIG. 1.

The data shown in FIGS. 12(*d*) and 12(*e*) are important since they represent differences from a reference state of a machine.

For example, when maximum density optimization control is performed in the gray-scale control, if the measured density is lower than a target density, the following causes are assumed:

(1) The charging performance of the photosensitive drum is deteriorated.

(2) The discharging efficiency is decreased due to, e.g., contamination of a wire of a primary charger.

(3) The toner concentration is decreased, and developing performance is deteriorated.

In this case, in order to increase the measured density, the gray-scale control is performed with the primary charging current, the primary charging grid bias, and the development bias, which are higher than the reference setting values. The setting values, which are determined in the gray-scale control under such background conditions, are stored in a memory. The setting values stored in the memory are displayed as service data upon maintenance of a machine. Thus, when the machine is restored to a reference state, the number of portions to be checked can be decreased.

FIGS. 13A and 13B show a display example to be displayed on a display unit 35 (FIG. 1) for maintenance. FIG. 13A shows reference values and actual output values of a primary current, a primary grid bias, and a development bias. FIG. 13A exemplifies a case wherein the developing density is increased with respect to the reference value. FIG. 13B shows the reference values, and differences from the reference values.

FIGS. 14A and 14B show another display example. In FIGS. 14A and 14B, the differences from the reference values are displayed as proper level displays, so that whether or not checking operations are necessary can be determined. For example, when the reference state is determined to have a primary current $=500\ \mu A$, a primary grid bias$=500$ V, and a development bias$=550$ V, a display level corresponding to each control amount is divided from −(5) to +(5), as shown in FIG. 14B, and is displayed, as shown in FIG. 14A. Underlines under −(5) and +(5) indicate that the machine state requires a checking operation.

FIG. 15 shows still another display example. In FIG. 15, when the gray-scale control is performed at proper time intervals in the same reference setting state as that in FIG. 14B, the corresponding control states are stored in a memory a proper number of times, so that the control history can be easily understood.

FIG. 15 shows a case wherein the control states corresponding to five gray-scale control operations are displayed. For example, when the gray-scale control is performed once a day, changes in control state for five days can be observed. The rightmost state in FIG. 15 indicates the latest control state, and the leftmost state indicates the control state five times before. In this case, the latest primary grid bias has a level (5), and this indicates that the charging potential of the photosensitive drum must be increased, and a portion corresponding to a development operation must be maintained.

Figures 16, 17:
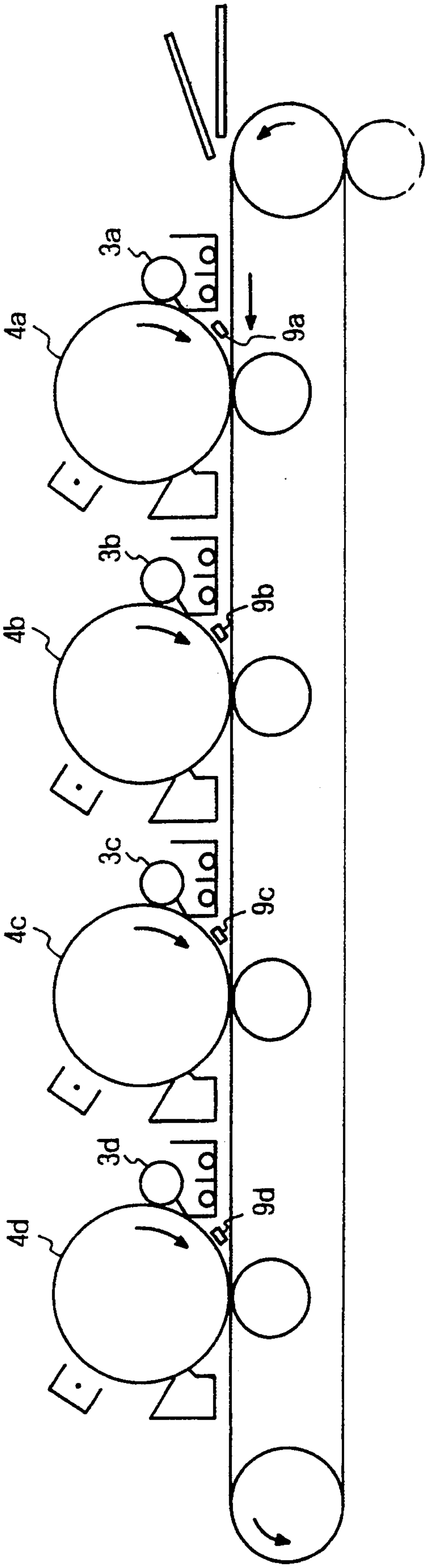
FIG. 16 is a table illustrating a display example according to still another embodiment of the present invention.
FIG. 17 is a diagram illustrating still another embodiment of the present invention.

FIG. 16 shows a display example when the gray-scale control is operated upon maintenance of the machine. Data displayed in the second to fifth columns in FIG. 15 are moved to the first to fourth columns, and a new control state as a result of the latest gray-scale control operation is displayed in the fifth column.

In FIG. 16, the primary current and the primary grid bias indicate the upper limit values, and this reveals that the performance of the primary charging system, and the charging performance of the photosensitive drum can be checked after the developing unit is checked.

The principal objects of the gray-scale control are to correct:

(1) Change in characteristic due to deterioration of toners, of the photosensitive drum, and the like, and (2) Differences in toner concentration control amount when two-component toners, and the like are used.

Of these changes, the principal object of the gray-scale control is to correct (1). This is because the driving conditions of the image forming elements (e.g., the toners and the photosensitive drum) of the image forming apparatus are set in advance in correspondence with new states. Therefore, when the development performance of the toner is decreased due to deterioration, or when the charging performance of the photosensitive drum or exposure vs. discharging amount characteristics change, a target image cannot be obtained under the predetermined conditions. Such a change in characteristic is inevitable, and the gray-scale control according to the present invention is one measure against this change.

As described above, the gray-scale control has its principal object to correct characteristics which change slowly. Therefore, the gray-scale control is performed after the power switch of the image forming apparatus is turned on, e.g., after the fixing temperature is increased up to about 60% of a use temperature, and a so-called initialization pre-rotation operation is performed.

In addition to the state after power-on, a maintenance person can perform a gray-scale control operation independently of a normal sequence, can detect the machine state with reference to the above-mentioned display screen, and can perform maintenance operations. In this case, the maintenance person can depress a service mode switch 51 arranged in the apparatus, and can select a mode for performing the gray-scale control using keys on an operation unit 50.

As for the display states shown in FIGS. 13A to 16, the maintenance person can depress the service mode switch 51, and can select a display mode using keys on the operation unit 50.

FIG. 17 shows a color image forming apparatus in which respective units of the photosensitive drum, the charger, and the developing unit are arranged in units of colors, e.g., yellow, magenta, cyan, and black.

In this apparatus, the gray-scale control operation is performed in correspondence with photosensitive drums. In the color image forming apparatus, after the power switch of the main body is turned on, e.g., after the initialization pre-rotation operation after the fixing temperature is increased up to a predetermined temperature, the gray-scale control is performed.

When the gray-scale control is performed for checking performance in, e.g., maintenance of the apparatus, the gray-scale control operation can be performed for only a photosensitive drum to be checked upon selection from the operation unit, and photosensitive drums can be prevented from being deteriorated since other photosensitive drums need not be moved.

When printer gray-scale characteristics drift in a direction to decrease the density, and the maximum density that can be output by the printer becomes lower than a setting value, the proper maximum density can no longer be obtained even if the LUT 25 is corrected in this circumstance. In general, as control for increasing the density, a method of increasing the contrast potential of the primary charger is known. However, the method of increasing the density by controlling the contrast potential is effective only within a range of the charging performance of the photosensitive drum, and when a charging voltage beyond the charging performance is applied, the photosensitive drum may be seriously damaged. Therefore, when a density beyond a correctable range is calculated, the CPU 33 determines an uncontrollable state, since the image forming apparatus may be fundamentally damaged. Thus, the CPU 33 outputs an error message indicating this on an operation panel.

The present invention is not limited to the above-mentioned embodiments, and various modifications may be made within the scope of appended claims.

What is claimed is:

1. An image forming apparatus comprising:

image forming means for forming an image on a recording medium;

signal generating means which generates for measurement, an image signal having an arbitrary density level;

measurement means for measuring a density of the image formed on the recording medium by said image forming means on the basis of the generated image signal having a predetermined density level;

control means for determining an operation condition of said image forming means on the basis of a measurement result from said measurement means;

storage means for storing the operation condition determined by said control means; and display means for reading out the operation condition stored in said storage means at a desired timing, and displaying the readout operation condition, wherein said control means controls a subsequent operation of said image forming means according to the operation condition stored in said storage means.

2. An apparatus according to claim 1, wherein said storage means stores a history of operation conditions determined at different timings by said control means, and said display means displays the history of the operation conditions.

3. An apparatus according to claim 1, wherein said control means comprises density conversion means for converting density characteristics, and corrects conversion characteristics of said density conversion means on the basis of the measurement result from said measurement means.

4. An apparatus according to claim 1, wherein said control means determines the operation condition on the basis of a difference between the measurement result of said measurement means and a target density.

5. An apparatus according to claim 1, wherein said image forming means includes conversion means for converting the density level of an input image signal, and wherein said control means determines a conversion characteristic of said conversion means on the basis of the measurement result of the density of the image formed on the basis of the generated image signal having a plurality of different densities.

6. An image forming apparatus according to claim 1, wherein said control means determines operation conditions in units of elements in said image forming means.

7. An image forming apparatus according to claim 6, wherein said display means displays the operation conditions in units of the elements.

8. An image forming apparatus according to claim 1, wherein said display means displays differences from reference values of the operation conditions.

9. An image forming apparatus comprising:

image forming means for forming an image on a recording medium;

signal generating means which generates for measurement an image signal having an arbitrary density level;

measurement means for measuring a density of the image formed on the recording medium by said image forming means on the basis of the generated image signal having a predetermined density level;

control means for determining an operation condition of said image forming means on the basis of a measurement result from said measurement means;

storage means for storing the operation condition determined by said control means; and display means, wherein said control means controls a subsequent operation of said image forming means according to the operation condition stored in said storage means and causes said display means to display whether or not said image forming means is operable under the determined operation condition.

10. An apparatus according to claim 9, wherein said control means determines the operation condition on the basis of a difference between the measurement result of said measurement means and a target density.

11. An apparatus according to claim 9, wherein said image forming means includes conversion means for converting the density level of an input image signal, and wherein said control means determines a conversion characteristic of said conversion means on the basis of the measurement result of the density of the image formed on the basis of the generated image signal having a plurality of different densities.

12. An image forming apparatus comprising:

a plurality of image forming means for respectively forming an image on a plurality of recording mediums;

signal generating means which generates for measurement, an image signal having an arbitrary density level;

measurement means for measuring a density of the image formed on each of the plurality of recording mediums by said plurality of image forming means on the basis of the generated image signal having a predetermined density level;

control means for determining each operation condition of said plurality of image forming means on the basis of a measurement result from said measurement means;

storage means for storing each operation condition determined by said control means; and input means for instructing which of said plurality of image forming means should have their operation condition determined, wherein said control means controls a subsequent operation of said image forming means according to the operation condition stored in said storage means, and wherein the operation condition is determined only for image forming means instructed by said input means.

13. An apparatus according to claim 12, wherein said plurality of image forming means form images having different colors respectively.

14. A method of operating an image forming apparatus comprising the steps of:

forming an image on a recording medium by an image forming means;

generating for measurement, by a signal generating means, an image signal having an arbitrary density level;

measuring, by a measurement means, a density of the image formed on the recording medium by said image forming means on the basis of the generated image signal having a predetermined density level;

determining, by a control means, an operation condition of said image forming means on the basis of a measurement result from said measurement means;

storing in a storage means the operation condition determined by said control means;

reading out the operation condition stored in said storage means at a desired timing;

displaying the readout operation condition on a display means; and controlling, by said control means, a subsequent operation of said image forming means according to the operation condition stored in said storage means.

15. The method according to claim 14, wherein in said storing step said storage means stores a history of operation conditions determined at different timings by said control means, and in said displaying step said display means displays the history of the operation conditions.

16. The method according to claim 14, wherein in said determining step said control means comprises density conversion means for converting density characteristics, and correcting conversion characteristics of said density conversion means on the basis of the measurement result from said measurement means in said measuring step.

17. The method according to claim 14, wherein in said determining step said control means determines the operation condition on the basis of a difference between the measurement result of said measurement means in said measuring step and a target density.

18. The method according to claim 14, including the steps of:

converting the density level of an input image signal by a conversion means; and determining by said control means a conversion characteristic of said conversion means on the basis of the measurement result of the density of the image formed on the basis of the generated image signal having a plurality of different densities.

19. The method according to claim 14, including the step of:

determining, by said control means, operation conditions in units of elements in said image forming means.

20. The method according to claim 19, including the step of:

displaying on said display means the operation conditions in units of the elements.

21. The method according to claim 14, including the step of:

displaying on said display means differences from reference values of the operation conditions.

22. A method of operating an image forming apparatus comprising the steps of:

forming an image on a recording medium by an image forming means;

generating for measurement, by a signal generating means, an image signal having an arbitrary density level;

measuring, by a measurement means, a density of the image formed on the recording medium by said image forming means on the basis of the generated image signal having a predetermined density level;

determining, by a control means, an operation condition of said image forming means on the basis of a measurement result from said measurement means;

storing in a storage means the operation condition determined by said control means;

controlling by said control means a subsequent operation of said image forming means according to the operation condition stored in said storage means; and causing a display means to display whether or not said image forming means can be operated under the determined operation condition.

23. The method according to claim 22, including the steps of:

determining by said control means the operation condition on the basis of a difference between the measurement result of said measurement means and a target density.

24. The method according to claim 22, including the steps of:

converting, by a conversion means, the density level of an input image signal; and determining by said control means a conversion characteristic of said conversion means on the basis of the measurement result of the density of the image formed on the basis of the generated image signal having a plurality of different densities.

25. A method of operating an image forming apparatus comprising the steps of:

forming an image, by a plurality of image forming means, on a plurality of recording mediums;

generating by signal generating means for measurement, an image signal having an arbitrary density level;

measuring, by a measurement means, a density of the image formed on each of the plurality of recording mediums by said plurality of image forming means on the basis of the generated image signal having a predetermined density level;

determining, by a control means, each operation condition of said plurality of image forming means on the basis of a measurement result from said measurement means;

storing in a storage means each operation condition determined by said control means;

instructing, by an input means, which of said plurality of image forming means should have their operation condition determined;

controlling, by said control means, a subsequent operation of said image forming means according to the operation condition stored in said storage means; and determining the operation condition only for image forming means instructed by said input means.

26. The method according to claim 25, including the step of:

forming, by said plurality of image forming means, images having different colors respectively.

* * * * *